US008375235B2

(12) United States Patent
Innan et al.

(10) Patent No.: US 8,375,235 B2
(45) Date of Patent: *Feb. 12, 2013

(54) STORAGE SYSTEM

(75) Inventors: Masataka Innan, Odawara (JP); Shigeo Homma, Odawara (JP); Akinobu Shimada, Chigasaki (JP); Hideo Tabuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,663

(22) Filed: Mar. 5, 2012

(65) Prior Publication Data
US 2012/0179925 A1 Jul. 12, 2012

Related U.S. Application Data

(63) Continuation of application No. 12/236,529, filed on Sep. 24, 2008, now Pat. No. 8,132,033.

(30) Foreign Application Priority Data

Jul. 7, 2008 (JP) .................................. 2008-177423

(51) Int. Cl.
G06F 1/32 (2006.01)
G06F 15/16 (2006.01)
G06F 13/14 (2006.01)
(52) U.S. Cl. ........ 713/324; 713/320; 709/219; 710/311; 710/306
(58) Field of Classification Search .................... 713/320
See application file for complete search history.

(56) References Cited

U.S. PATENT DOCUMENTS

| 7,747,800 | B2 | 6/2010 | Zimoto et al. |
| 2003/0193733 | A1 | 10/2003 | Hakamata et al. |
| 2005/0273638 | A1 | 12/2005 | Kaiju et al. |
| 2006/0036605 | A1 | 2/2006 | Powell et al. |
| 2006/0059172 | A1 | 3/2006 | Devarakonda |
| 2008/0040543 | A1 | 2/2008 | Yamazaki et al. |
| 2008/0080131 | A1 | 4/2008 | Hori et al. |
| 2008/0126701 | A1 | 5/2008 | Uehara et al. |
| 2009/0083558 | A1 | 3/2009 | Sugiki et al. |
| 2009/0276648 | A1 | 11/2009 | Haustein et al. |
| 2010/0223418 | A1 | 9/2010 | Kumasawa et al. |

FOREIGN PATENT DOCUMENTS

| CN | 1674538 | 9/2005 |
| CN | 1869880 | 11/2006 |
| JP | 2000-293314 | 10/2000 |
| JP | 2008-090352 | 4/2008 |
| WO | WO 2004/049147 | 6/2004 |

OTHER PUBLICATIONS

JP Office Action for Japanese Application No. 2008-177423, dated Sep. 25, 2012.

*Primary Examiner* — Ryan Stiglic
(74) *Attorney, Agent, or Firm* — Antonelli, Terry, Stout & Kraus, LLP.

(57) ABSTRACT

A storage system including: a storage apparatus including a plurality of storage devices on which a plurality of logical units is configured and a first controller that controls accesses to the plurality of logical units; and a file server coupled to said storage apparatus and including a second controller and a memory storing management information which indicates relationships between each of the plurality of logical units and each of a plurality of indicators; wherein the first controller, in response to a request to create a first folder with a first indicator, creates the folder on one or more first logical units included in the plurality of logical units, the one or more first logical units related to the first indicator.

9 Claims, 16 Drawing Sheets

FIG. 3

| DISK DRIVE UNIT # | DISK DRIVE UNIT POWER SUPPLY STATE | HDD# | HDD OPERATION MODE | LU# | MODE ALLOWING DESIGNATION OF POWER SUPPLY CONTROL FOR HDD ||||
|---|---|---|---|---|---|---|---|---|
| | | | | | FULL TIME ON | LOW ROTATIONAL SPEED | SPIN DOWN | OFF |
| 01 | ON | 1 | READY | 0 | YES | NO | NO | NO |
| | | 2 | READY | 0 | YES | NO | NO | NO |
| | | ... | ... | ... | ... | ... | ... | ... |
| | | 14 | READY | 0 | YES | NO | NO | NO |
| | | 15 | SPIN DOWN | 1 | YES | YES | YES | NO |
| 02 | ON | 1 | SPIN DOWN | 1 | YES | YES | YES | NO |
| | | 2 | SPIN DOWN | 1 | YES | YES | YES | NO |
| | | ... | ... | ... | ... | ... | ... | ... |
| | | 10 | SPIN DOWN | 1 | YES | YES | YES | NO |
| | | 11 | OFF | 2 | YES | YES | YES | YES |
| | | 12 | OFF | 2 | YES | YES | YES | YES |
| | | ... | ... | ... | ... | | | ... |
| | | 15 | OFF | 2 | YES | | | YES |
| ... | ... | ... | ... | ... | ... | ... | ... | ... |

FIG. 4

| LU# | LU OPERATION MODE | TOV INDICATOR | MODE ALLOWING DESIGNATION OF POWER SUPPLY CONTROL FOR LU | | | |
|---|---|---|---|---|---|---|
| | | | LOW ROTATIONAL SPEED | SPIN DOWN | OFF | DISK DRIVE UNIT OFF |
| 0 | READY | ONLINE | NO | NO | NO | NO |
| 1 | SPIN DOWN | NEAR LINE | YES | YES | YES | NO |
| 2 | OFF | OFFLINE | YES | YES | YES | YES |
| 3 | READY | ONLINE | NO | NO | NO | NO |
| 4 | READY | ONLINE | NO | NO | NO | NO |
| ... | ... | ... | ... | ... | ... | ... |

FIG. 5

| DATE AND TIME OF CREATION | SAVING PERIOD | TOV INDICATOR | DATE AND TIME OF LAST ACCESS |
|---|---|---|---|
| xxxx/xx/xx yy:yy:yy | xxxx/xx/xx yy:yy:yy | ONLINE | xxxx/xx/xx yy:yy:yy |

FIG. 17

| NAME OF FILE | FOLDER 1 | FOLDER 2 |
|---|---|---|
| xxxxxxx.xxx | ¥¥yyyy¥yyy¥yyy | ¥¥yyy¥zzz¥zzz |
| xxxxxxx.xxx | ¥¥yyyy¥yyy¥yyy | ¥¥yyy¥zzz¥zzz |
| ... | ... | ... |
| ... | ... | ... |

STORAGE SYSTEM

CROSS REFERENCES TO RELATED APPLICATIONS

This is a continuation of U.S. application Ser. No. 12/236,529, filed Sep. 24, 2008 now U.S. Pat. No. 8,132,033. This application relates to and claims priority from Japanese Patent Application No. 2008-177423, filed on Jul. 7, 2008. The entirety of the contents and subject matter of all of the above is incorporated herein by reference.

BACKGROUND OF THE INVENTION

The present invention relates to a storage system, and it particularly relates to a storage system having a power saving function for a storage device and a control method therefor.

Hitherto, a storage system has been known that includes a server and a disk array subsystem including an array of multiple hard disk drives (which will be called HDD hereinafter) for providing storage areas to the server.

The server uses the disk array subsystem for multiple applications, and one application is that the server uses the disk array subsystem for archiving. By the way, keeping the HDDs on at all times which are not frequently accessed is not preferable from the viewpoint of power saving in the disk array subsystem. Accordingly, a power saving technology called MAID (or Massive Array of Inactive Disks) is applied to the storage system. The accesses include a read request and a write request.

MAID refers to a technology that reduces the power consumption by terminating the rotation of a disk in an HDD without any data access or shutting down the power supply to an HDD in a disk array. Since a disk array that adopts MAID is controlled to only operate the HDD that requires data access, the power consumption can be reduced.

On the other hand, several power saving modes employing the MAID function according to the degree of the power saving function have been known such as a mode that shuts down the power supply to a chassis containing multiple HDDs, a mode that shuts down the power supply to an HDD and a mode that terminates the rotation of a disk in an HDD. A disk array system has also been known that includes multiple logical units with the hierarchy of degrees of the power saving function and, according to the frequency of the access request to one logical unit, moves the data stored therein to a logical unit applying a different power saving mode (JP-A-2008-90352).

Patent Document 1: JP-A-2008-90352

SUMMARY OF THE INVENTION

Since the conventional disk array subsystem may not determine before data storage whether the archive data to be written from the server is online data that requires a high accessibility from the server, offline data that requires a lower accessibility from the server or near-line data that requires the accessibility between online data and offline data from the server, data cannot be stored in an HDD having an appropriate power saving function.

Therefore, the conventional disk array subsystem has a possibility that online data may be stored in an HDD applying the mode that shuts down the power supply to the HDD, which is a power saving mode having a high power saving effect but taking time for response. Then, when an access request to the online data occurs from the server, there is a possibility that the performance of response to the access to the online data may be reduced, and the access from the server may timeout.

Accordingly, it is an object of the present invention to provide a storage system having a function of saving power to a storage device and control method therefor, which do not reduce the performance of response to an access from a server to the storage device.

According to an aspect of the invention, there is provided a storage system including a file server connecting to a computer over a network and a storage apparatus connecting to the file server connecting over the network, wherein the file server includes a first controller, the storage apparatus includes multiple storage devices having multiple storage areas and a second controller that controls accesses to the multiple storage areas, each of the multiple storage areas has at least one power saving mode among multiple power saving modes with different shift times from the power saving modes to a ready mode, the first controller, in response to the reception of data from the computer, sets an indicator relating to the performance of response to an access from the computer to the data and refers to the indicator of the data and selects a first storage area having the power saving mode satisfying the indicator, and the second controller stores the data to the first storage area.

According to another aspect of the invention, there is provided a control method for a storage system, the storage system having a file server connecting to a computer over a network and a storage apparatus connecting to the file server connecting over the network, the storage apparatus including multiple storage devices having multiple storage areas and controlling accesses to the multiple storage areas, the method including the steps of setting each of the multiple storage areas in at least one power saving mode among multiple power saving modes with different shift times from the power saving modes to a ready mode by the storage apparatus, setting an indicator relating to the performance of response to an access from the computer to the data received from the computer by the file server and referring to the indicator of the data and selecting a first storage area having the power saving mode satisfying the indicator by the file server; and storing the data to the first storage area by the storage apparatus.

According to the invention, there can be provided a storage system having a function of saving power to a storage device and control method therefor, which do not reduce the performance of response to an access from a server to the storage device.

BRIEF DESCRIPTION OF THE DRAWINGS

FIG. 3 shows a first management table according to one embodiment of the invention;

FIG. 4 shows a second management table according to one embodiment of the invention;

FIG. 5 is a block diagram showing a structure of metadata according to one embodiment of the invention;

FIG. 17 is a table managing the movement of files according to one embodiment of the invention.

DESCRIPTION OF THE PREFERRED EMBODIMENTS

Figure 1:
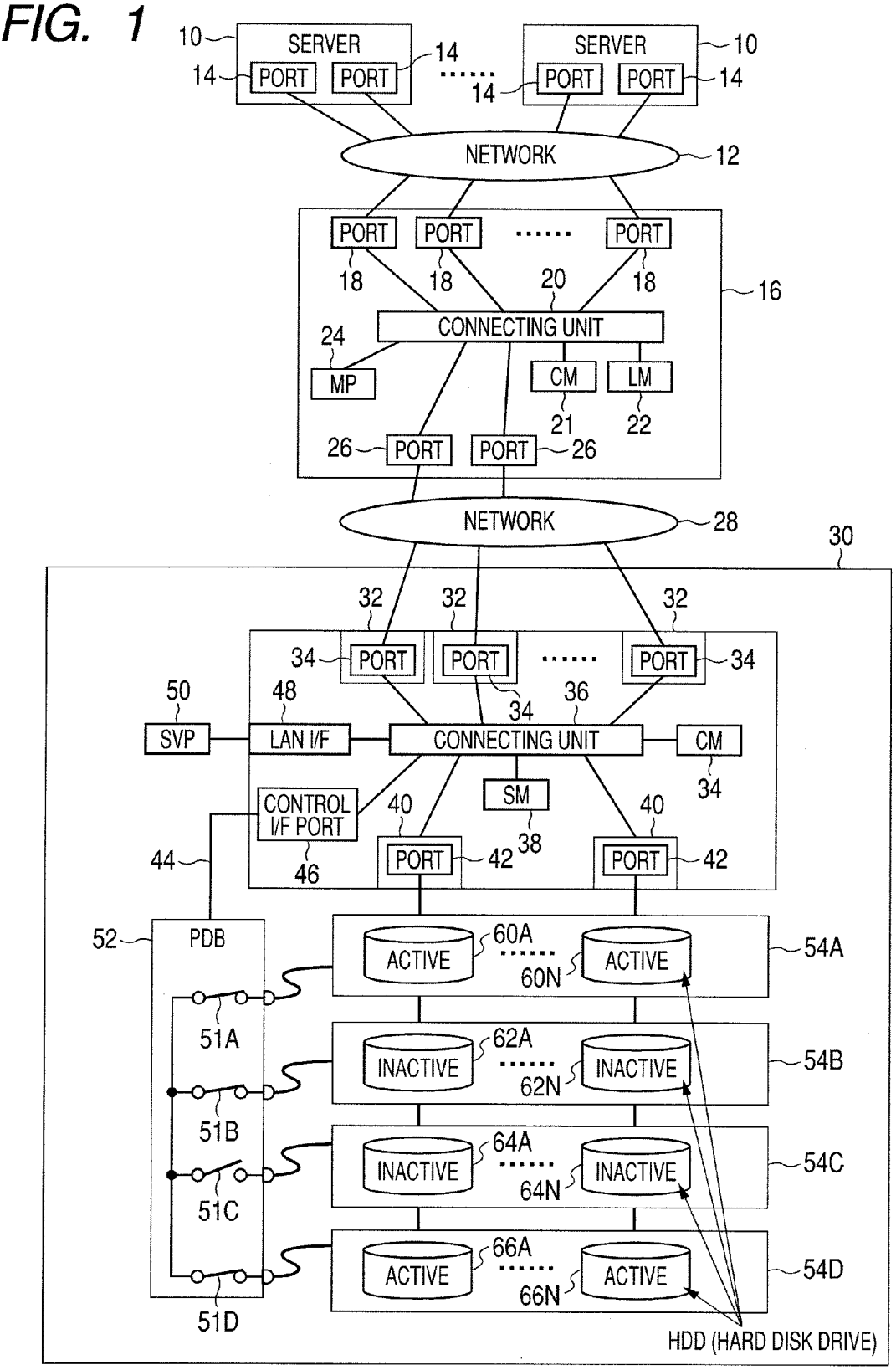
FIG. 1 is a block diagram of a storage control system including a storage system according to one embodiment of the invention.

Embodiments of the invention will be described next. FIG. 1 is a block diagram of a storage control system including an example of the storage system according to the invention. The storage control system includes a service server 10 positioned as a host system for a storage apparatus and a storage system including a file server 16 and a storage apparatus 30. The file server 16 and the storage apparatus 30 may be placed within one chassis.

The service server 10 is a computer apparatus including information processing resources such as a CPU and a memory. The service server includes an information input device such as keyboard switches, a pointing device and a microphone and an information output device such as a monitor and a speaker.

The service server 10 recognizes the storage structure with a file system of the file server 16 and writes and reads data to and from the file system. The service server 10 may include archiving software for providing an archive solution to a client. The service server 10 may provide an operation application to a management client, excluding archiving software.

A network 12 connects to a port 14 of a LAN interface controller of each of the multiple service servers. A port 18 of the LAN interface of the file server 16 connects to the network 12. The service server 10 connects to the file server 16 over the network 12.

The file server 16 further includes a microprocessor 24, a cache memory 21 and a local memory 22, in addition to the port 18. Those devices connect to each other through a connecting unit 20. The cache memory 21 is a memory that temporarily saves data transmitted from the service server 10. The local memory 22 stores programs and management information for implementing control functions of the file server 16.

Figure 2:
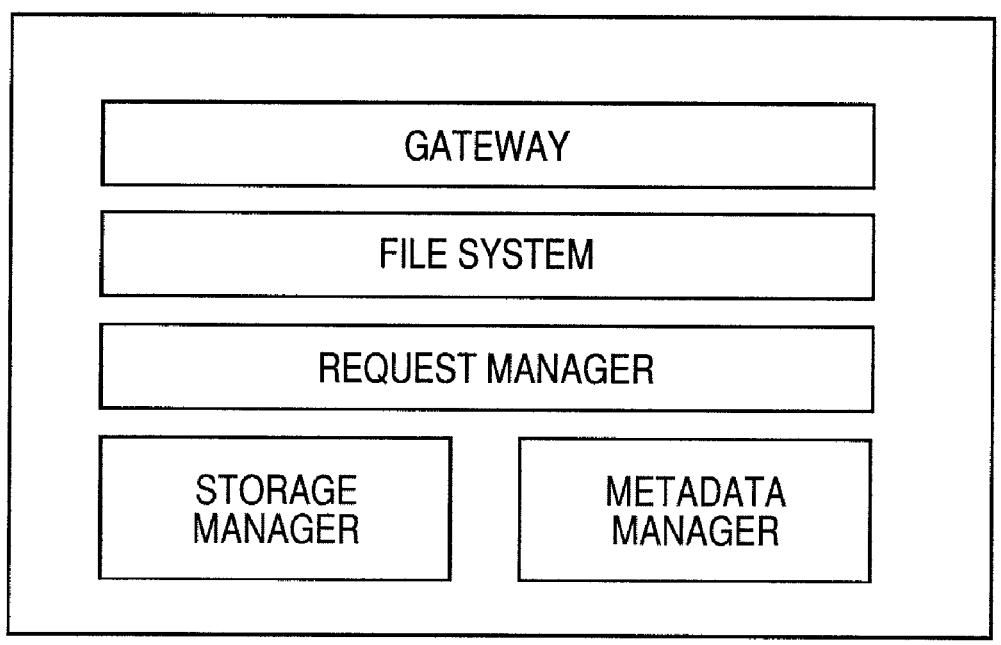
FIG. 2 is a block diagram illustrating programs in a file server according to one embodiment of the invention.

FIG. 2 is examples of the programs that implement functions of the file server 16. The programs are stored in a local memory 22. The microprocessor 24 then executes the programs to implement the functions of the file server. Gateway provides a communication protocol required for communication with the service server 10 to the microprocessor 24. File System recognizes a file access from the service server 10 and determines the storage area, which will be a destination of the data access from the service server 10.

Request Manager processes an access from the service server 10 and performs processing such as creation and update of metadata. Storage Manager performs processing for reading/writing from/to the storage apparatus 30. Metadata Manager performs processing for reading/writing from/to metadata.

The file server 16 further includes a port 26 for a fiber channel interface controller, and the port 26 connects to a network 28. The network 28 may be an SAN. The file server 16 requests a storage apparatus to input/output data in blocks, each of which is a management unit of a storage area of an HDD, according to Fiber Channel Protocol.

The storage apparatus 30 includes an HDD as a storage device. The storage apparatus 30 may be a disk array subsystem including multiple HDDs. Without limiting thereto, a part of storage devices may be semiconductor memories such as a flash memory.

The storage apparatus 30 has multiple disk drive units 54A to 54D as storage devices and multiple disk adapters (DKAs) 40 which control the input/output of data to/from the disk drive units. Each of the DKA 40 has a port 42 connecting to the disk drive units. The ports 42 and the disk drive units are connected by an FC-AL or Fabric of Fiber Channel or an SAS, for example.

The storage apparatus 30 includes multiple channel adapters (CHAs) 32 each functioning as an interface controller for the file server 16. Each of CHAs has a port 34. Connecting the port 34 to the network 28 connects the storage apparatus 30 to the file server 16.

The CHAs 32 and the DKAs 40 are connected through a connecting unit (or connecting circuit) 36. The connecting unit 36 further connects to a shared memory (SM) 38 and a cache memory (CM) 34. Each of the CHAs 32 includes a microprocessor (MP) and a local memory (LM) that stores a microprogram to be executed by the MP for processing a command transmitted from the file server 16. Each of the DKAs 40 includes an MP and an LM to be used by the MP for executing a microprogram for controlling the multiple disk drive units.

In order to perform interlocked processing between the multiple CHAs 32 and the multiple DKAs 40, control information to be shared by them exists in the shared memory 38. In response to the reception of a readout or write command for data from the file server 16, the corresponding CHA 32 stores the command to the shared memory 38. The DKA 40 refers to the shared memory 38 at all times, and, if any unprocessed readout command is found, reads out data from a corresponding HDD and stores it in the cache memory 34.

The CHA 32 reads out the data moved to the cache memory 34 and transmits it to the file server 16 having issued the command. In response to the reception of a data write request from the file server 16, the corresponding CHA 32 stores the write command in the shared memory 38 and stores the receive data in the cache memory 34. The DKA 40 stores the data stored in the cache memory 34 in an HDD according to the command stored in the shared memory 38.

The DKA 40 converts a logical address accompanying the command from the file server 16 to a physical address in an HDD upon input/output of data to/from the HDD. Each of the DKAs 40 performs data access according to the RAID configuration of a corresponding HDD.

Each of the DKAs monitors the modes including power saving modes of HDDs at all times, and the monitoring results are transmitted to an SVP (or service processor) 50 through a LAN interface 48 connecting to the connecting unit 36. The SVP 50 is a computer apparatus (or management device) that manages and monitors the storage apparatus. The SVP collects environmental information and performance information, for example, from the CHAs 32 and DKAs 40 through the connecting unit 36.

A work area is defined in the shared memory 38, and the shared memory 38 stores a first management table (refer to FIG. 3) and second management table (refer to FIG. 4), which will be described below.

The connecting unit 36 may be configured as a high-speed bus such as an ultra-high speed crossbar switch that performs data transmission based on a high-speed switching operation.

The storage apparatus 30 includes a control interface port 46 connecting to a control signal 44 connecting to a power supply circuit (or PDB: Power Distribution Block) 52 that controls the power supply to the disk drive units 54A to 54D. The power supply control circuit 52 includes switches 51A to 51D that turn on/off the power supply to the multiple disk drive units 54A to 54D.

Each of the switches 51A to 51D connects to one of the disk drive units 54A to 54D, and each of the disk drive units includes multiple HDDs 60A to 60N (or 62A to 62N, 64A to 64N or 66A to 66N). If one switch of the power supply control circuit 52 is opened, the power supply to all of the HDDs belonging to the disk drive unit connecting to the switch is shut down. Therefore, the power supply to the HDDs is turned off (which is called disk drive unit off mode). With one switch of the power supply control circuit closed, the power can be supplied to the multiple HDDs included in the disk drive unit connecting to the switch. Therefore, they can be controlled into a power saving mode by the DKA 40. The power saving mode may be a mode in which the power supply to an HDD is off (which will be called HDD off mode), a mode in which the rotations of the disk in an HDD stop (which will be called spin down mode), a mode in which the disk in an HDD rotates at a lower rotational speed (which will be called low rotational speed mode) or a mode in which the head of an HDD is unloaded from the above of a disk (which will be called head unload mode). The switches of the power supply control circuit are controlled by the MP of the CHA or the MP of the DKA.

Referring to FIG. 1, the "Active" in the HDDs means that they are in a mode that the HDDs are ON and at a high rotational speed, which is a ready mode in which data can be immediately written thereto according to a write command or data can be immediately output therefrom according to a read command. The "Inactive" means that the corresponding HDD is in a power saving mode such as the HDD off mode, spin down mode, low rotational speed mode, head unload mode and disk drive unit off mode.

The DKA 40 of the storage apparatus has a power supply control program in a local memory of the DKA 40 for shifting the HDD from the ready mode to the power saving mode. Then, the MP of the DKA executes the program. The CHA 32 and the DKA 40 execute a manager program for read or write processing on an HDD.

If an HDD is in the power saving mode, the storage apparatus, in order to respond to a write command or a read command, must shift the HDD to the ready mode once, which reduces the performance of response of the HDD to the write command and the read command and results in the timeout.

Accordingly, the service server 10 or file server 30 sets an indicator based on an acceptable timeout value (which will be called TOV indicator hereinafter) as an indicator indicative of the access performance of response from the service server 10 to the data for which write request is transmitted from the service server 10 to the file server 30 shown in FIG. 1. On the other hand, a logical unit (or LU) including at least one HDD is classified based on the indicator. For example, the LU including the HDD off mode as the power saving mode is classified to the "Offline" with a longer TOV value as an indicator on the accessibility. Then, the file server 16 compares the TOV indicator of the data and the TOV indicator of the logical unit and stores the data in the HDD of the logical unit which is matched with the indicator of the data.

The storage apparatus or file server sets the TOV value as an acceptable time for responding to each write access or read access. Without any response from an HDD even after a lapse of the TOV value, the storage apparatus or file server determines it as a write error or read error.

The data not requiring high access performance of response for accesses from a host system and accepting a higher TOV value (on the order of several minutes) in responding to an access is called "offline data". A storage device for storing offline data is set in a disk drive unit off mode or HDD off mode, for example, as the power saving mode, requiring a time of several minutes for the shift from the power saving mode to the ready mode. Those storage devices have "Offline" as the TOV indicator. According to this embodiment, the HDD off mode is set therefor.

On the other hand, data requiring high access performance of response to an access from a host system and accepting a lower TOV value (on the order of several seconds) in responding to an access is called "online data". A storage device for storing the online data may be set in the ready mode at all times or may be set in the head unload mode or low rotational speed mode, which can be shifted to the ready mode in a short period of time on the other of several seconds among the power saving modes. According to this embodiment, the ready mode is set therefor at all times. Those storage devices have "Online" as the TOV indicator.

The data requiring the access performance of response in the middle (on the order of several tens seconds) between those of Online data and Off line data is called "near line data". The storage device for storing the near line data is set in the spin down mode, as the power saving mode, requiring a time of several tens seconds for shifting from the power saving mode to the ready mode. Those storage devices have "Near Line" as the TOV indicator.

The operation modes of the storage devices for storing the online data, near line data and offline data are not limited thereto but can be changed as required based on the relationship between the TOV value and the time for shifting from the power saving mode to the ready mode.

FIG. 3 is a first management table showing the correspondence relationships among the disk drive units, HDDs and LUs, the power supply state of the disk drive units, the current operation modes of the HDDs and the power saving modes supported by the HDDs. FIG. 4 is a second management table showing the current operation modes of the LUs, the TOV indicators indicative of the access performance of response of the LUs and the power saving modes supported by the LUs. With reference to the figures, description will be given below.

In FIG. 3, "Disk Drive Unit #" is a symbol for identifying each of the disk drive units 54A to 54D of FIG. 1, "Disk drive unit Operation Mode" is a mode in which the power supply to the disk drive unit is performed (ON) or the power supply is shut down (OFF), "HDD#" is an identification number of an HDD belonging to each of the disk drive units, "the HDD Operation Mode" is the current operation mode (which is the ready mode or one of the power saving modes) of each of the HDDs, "LU#" is an identification symbol of a logical unit (LU), "Mode Allowing Designation of Power Supply Control For HDD" is information describing the power saving function supported by each of the HDDs among the power saving functions. "Full Time ON" describes whether the mode in which the power supply of an HDD is ON at all times is supported or not, "Low Rotational Speed" describes whether the low rotational speed mode is supported or not, "Spin Down" describes whether the spin down mode is supported or not, and "OFF" describes whether the HDD off mode is supported or not.

Under "Mode Allowing Designation of Power Supply Control For HDD", "Yes" means the corresponding HDD supports the power saving functions, and "No" means that the HDD does not support the power saving functions.

Which HDD is to be included in each of the LUs may be designated by a management client through the SVP or may be designated by the storage apparatus based on the information on the HDD. In this case, each of the LUs is preferably defined to include multiple HDDs supporting same power saving modes. Here, whether same power saving modes are supported or not may be determined based on whether at least one same power saving mode is supported or not since all of the power saving modes are not required to be completely the same.

Here, the management client of the SVP can discriminate each of the multiple disk drive units and can discriminate each of the multiple HDDs. The DKA 40 can recognize the operation modes of the disk drive units and the power saving mode of the HDDs based on the status information from the disk drive units and HDDs.

In FIG. 4 on the other hand, "LU#" is an identification symbol of an LU, and "LU Operation Mode" describes whether the HDDs included in the LU are in the ready mode or in one of the power saving mode. Generally, the multiple HDDs included in the LU have a same operation mode. For example, all of the HDDs included in an LU 1 in the disk spin down mode have the spin down mode in FIG. 3. "TOV Indicator" is an indicator relating to the access performance of response in a case where an access command is received from the service server in the power saving mode. "Mode Allowing Designation of Power Supply Control For LU" is an item of the power saving function supported by the LU#. Therefore, it is determined by the power saving function supported by the multiple HDDs included in the LU#. The meanings of the items are the same as those in FIG. 3. "Disk Drive Unit OFF" refers to whether the disk drive unit belonging to an LU supports the disk drive unit off mode or not.

The "TOV indicator" of the second management table is determined by the setting of the power saving mode of the multiple HDDs included in an LU. That is, according to this embodiment, in order to set "Online" as the TOV indicator, the HDDs included in an LU must be at least in the ready mode at all times. Similarly, in order to set "Near Line", the HDDs included in an LU must be at least in the spin down mode. Similarly, in order set "Offline", the HDDs included in an LU must be at least in the HDD off mode.

FIG. 5 shows a structure of metadata. The metadata is provided for each file and is created or updated every time the file is created or updated. The opportunity for the update is not limited thereto, but the metadata may be updated as required by a management client or may be configured to update automatically after a lapse of a predetermined period of time. The metadata includes the date and time of creation, saving period, TOV indicator and date and time of the last access. The TOV indicator may be a TOV (such as XX seconds and XXX minutes) itself or may be Online, Offline or Near Line.

Figure 6:
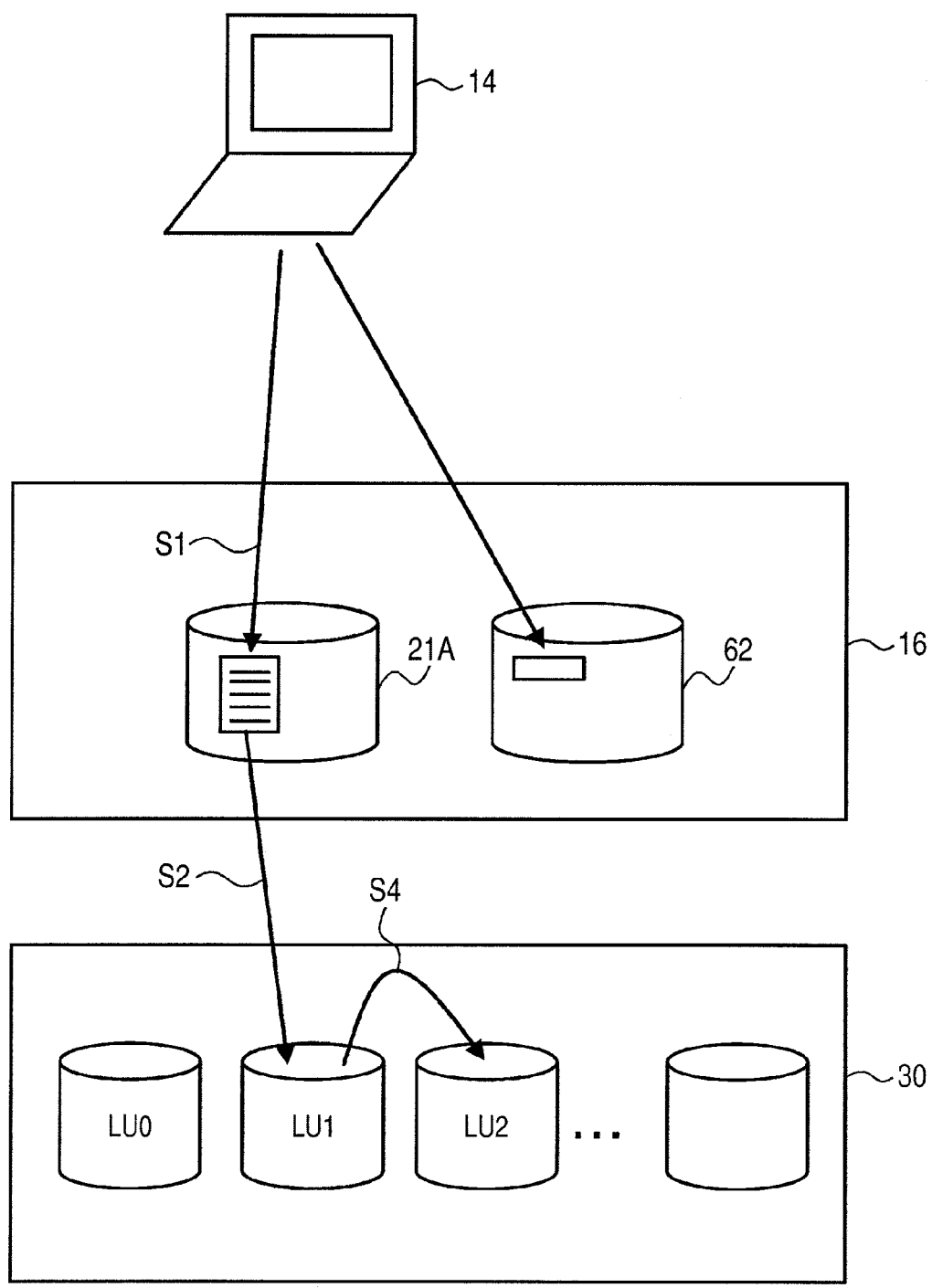
FIG. 6 is a block diagram illustrating a general outline of an operation for storing data in a storage apparatus by the file server according to one embodiment of the invention.

FIG. 6 is a block diagram showing an example of the general outline of the operation by the file server 16 for storing data to the storage apparatus 30. After the server 10 stores data to a file 60 in the file server 16 over the network 12 (S1), File System stores the file 60 to a data area (such as a cache memory) 21A. On the other hand, File System creates or determines the metadata from the file information and stores it to a metadata area 62. The metadata area is stored in the local memory 22. A storage manager of the file server 16 designates the logical volume (LU) in the storage apparatus 30 having an indicator matched with the TOV indicator contained in the metadata of the data of the file (S2). The management client can change the attribute of the file and, if the change in attribute of the file relates to the TOV indicator, the data of the file is moved from the storage area storing the data to a storage area supporting the changed TOV indicator (S4).

If the file server receives a write command or read command on data from the service server, the LU for storing the data is determined. Then, if the destination LU operates in the power saving mode, the storage apparatus shifts the power saving mode of the HDDs to the ready mode according to the instruction from the file server. Then, after a lapse of a predetermined period of time with reference to the date and time of the last access in FIG. 5, the storage apparatus shifts the ready mode of the HDDs to the power saving mode according to the instruction from the file server. The ready mode of the HDDs may be shifted to the power saving mode according to the instruction by the management client.

The instruction by the file server may be implemented by issuing a command to the storage apparatus. In issuing the command for shifting to the power saving mode or to the ready mode to the storage apparatus, the file server identifies not only an LU but also an HDD included in the LU as the storage area.

On the other hand, in a variation example, which will be described later, the file server only holds the second management table shown in FIG. 4, which is referred to identify an LU as the storage area to issue the command to the LU. The storage apparatus having received the command refers to the first management table to determine the HDD included in the LU. The details will be described later.

Figure 7:
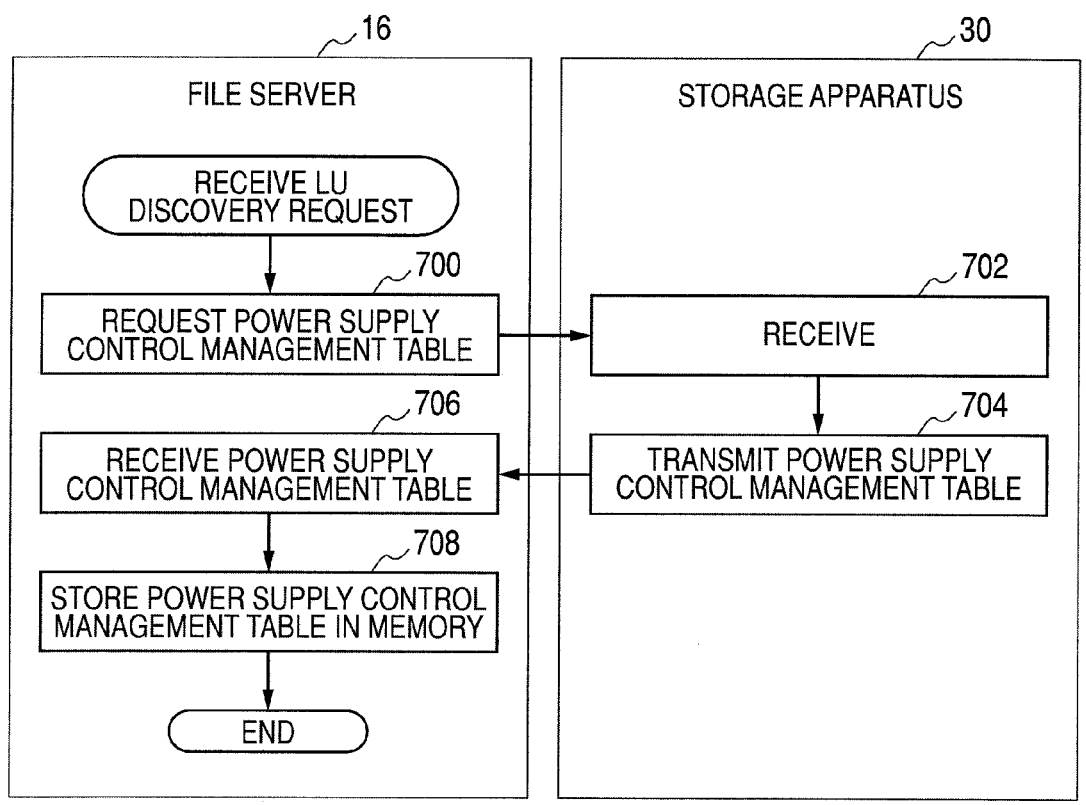
FIG. 7 is a block diagram illustrating the definition of the management table to the file server according to one embodiment of the invention.

First of all, the operation will be described for setting the first management table shown in FIG. 3 and the second management table shown in FIG. 4 to the file server. FIG. 7 is a flowchart illustrating the operation for defining the first management table and the second management table.

If Request Manger of the file server 16 receives an LU discovery request for the storage apparatus from the management device of the file server, Request Manager requests the storage apparatus 30 the first management table and the second management table (700). The CHA 32 of the storage apparatus receives the request (702), loads the first management table and second management table from the shared memory 38 and transmits the first management table and second management table to Request Manager of the file server (704). Request Manager receives the first management table and second management table (706) and then stores them to the local memory 22 (708).

The file server may receive information corresponding to the items on the first management table and second management table from the storage apparatus and may create and store the first management table and second management table in the file server.

The support information of the power saving modes of an HDD may be obtained by obtaining product information of the HDD by the DKA upon installation of the HDD to the storage apparatus, replacement of the HDD or addition of an HDD. The management client may input the support information through the SVP.

Figure 8:
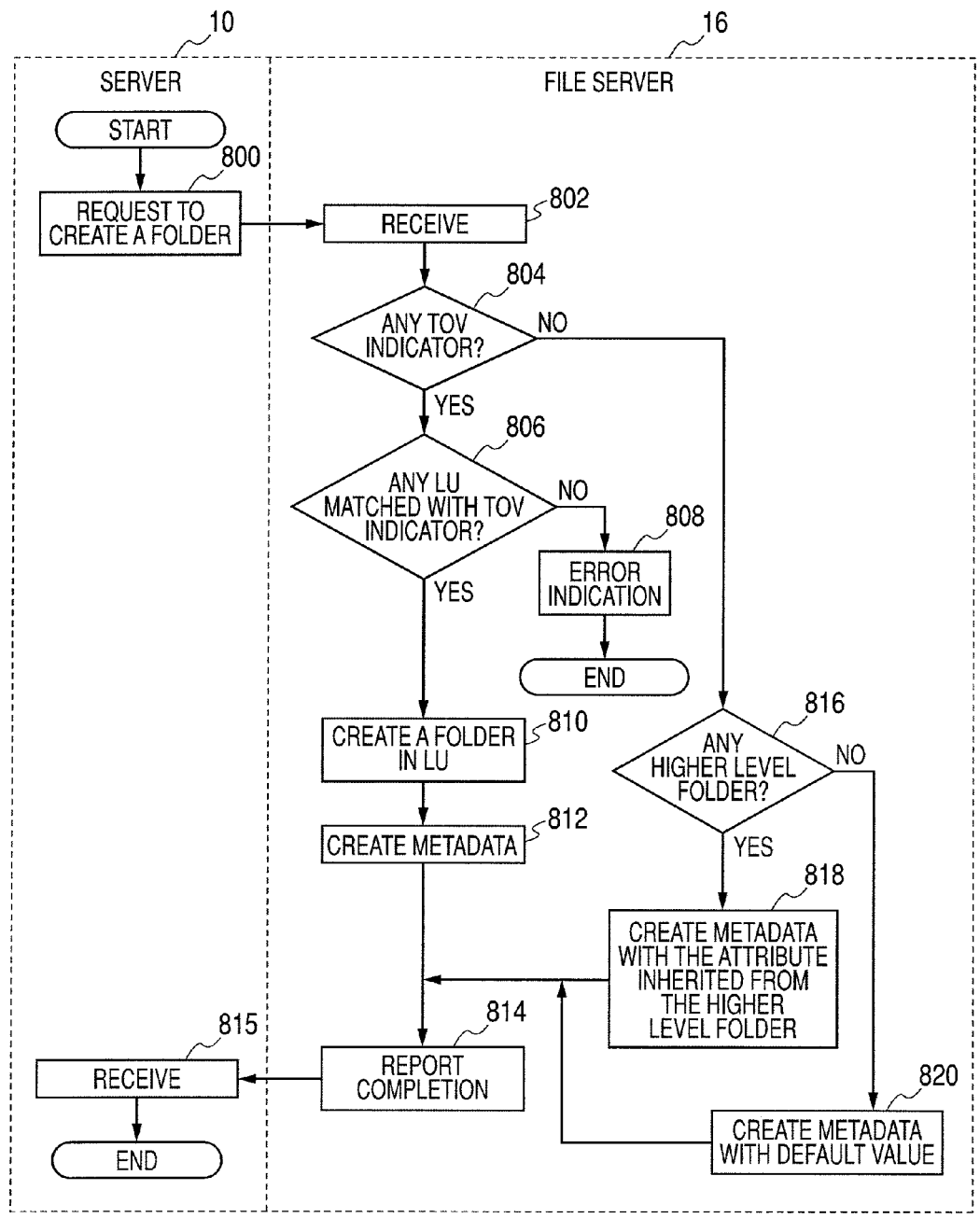
FIG. 8 is a flowchart for creating a folder in File System by the file server according to one embodiment of the invention.

Next, the method for setting a file system based on the TOV indicator of data in the file server will be described. After the service server 10 stores data to a file system of the file server, the TOV indicator is set to the metadata shown in FIG. 5. While the file system according to this embodiment has a folder directory structure, the structure is not limited thereto. FIG. 8 shows a flowchart for creating a folder in File System by the file server. First of all, the service server 10 issues a command for creating a folder to the file server 16 (800). Request Manager receives it (802) and then checks whether the folder creation command contains a TOV indicator or not (804).

If Request Manager determines so (804: Y), Request Manager checks the second management table and determines whether any LU exists that is matched with the TOV indicator contained in the command or not (806). If not (806: N), an error may be indicated to the service server (808), and the service server may be prompted to create a folder again. The file server may create an LU having an indicator corresponding to the TOV indicator contained in the command. If a matched LU exists (806:Y), Request Manager creates a folder in the corresponding LU (810) and creates the metadata of the folder (812). After that, Request Manager of the file server issues a completion report (814) and the processing ends when the service server receives it (815).

If the folder creation request command does not contain the TOV indicator (804: N), whether any higher level folder than the folder to be created exists or not is determined (816). If so (816:Y), the TOV indicator of the metadata of the higher level folder is set to the metadata of the folder to be created (818). On the other hand, if no folders exist at a higher level than the folder to be created (816: N), a default TOV indicator (such as Online) is set to the folder to be created (820), and the metadata of the folder is created.

After the management client of the service server stores the file in the folder having the TOV indicator aimed by the management client, the file server reflects the TOV indicator set to the metadata of the folder to the TOV indicator of the metadata of the file. The folder may be an online data folder, a near-Line folder or an offline folder.

Figure 9:
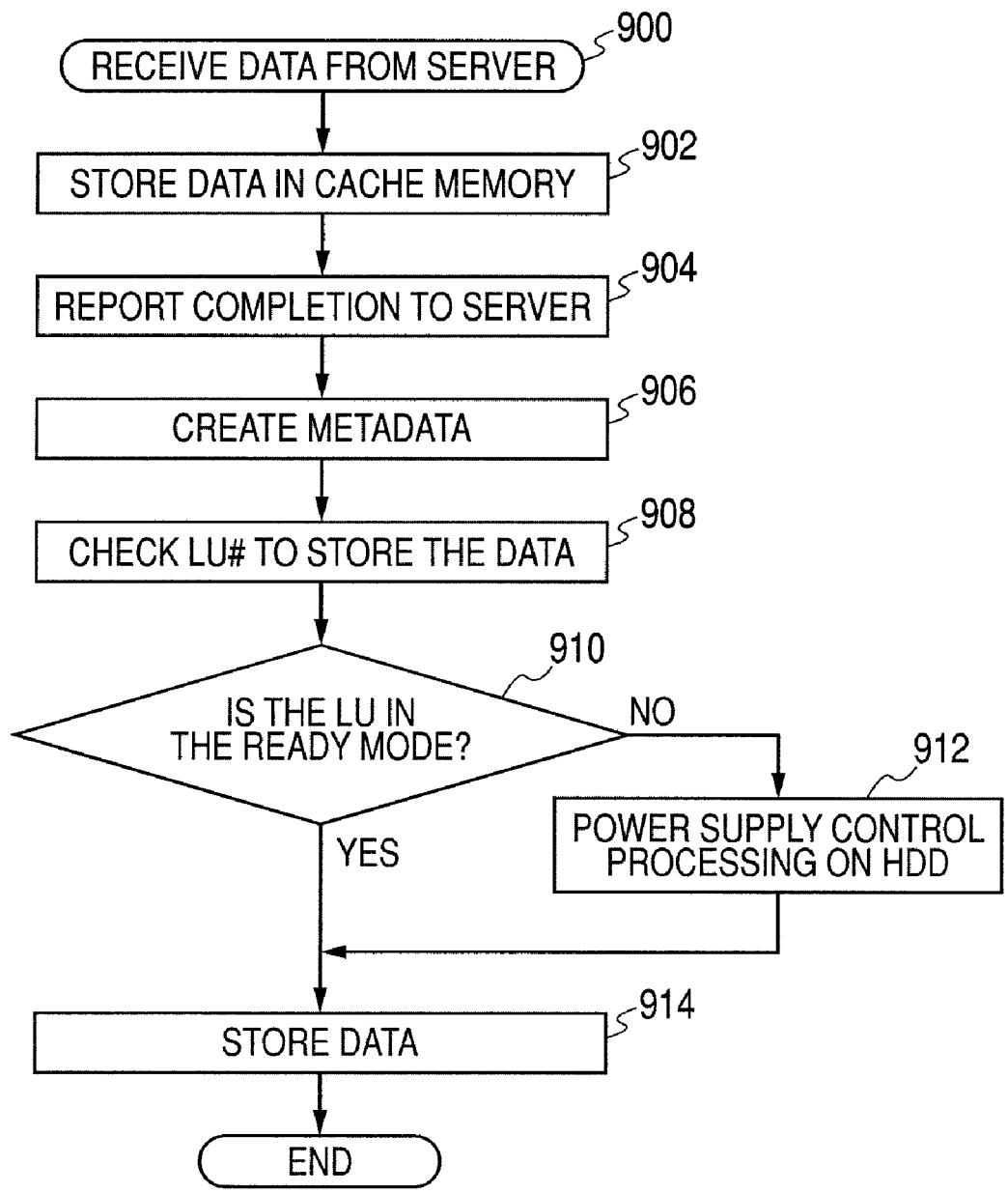
FIG. 9 is a flowchart illustrating an operation for storing data received from a service server to the storage apparatus by the file server according to one embodiment of the invention.

Next, operations will be described for storing data of a file to the storage apparatus by the file server and for saving power to an HDD in the storage apparatus. FIG. 9 is a flowchart of an operation for receiving a file from the service server 10 and storing the file to the storage apparatus by the file server 16. After receiving a file from the service server (900), Request Manager of the file server 16 stores the data to the cache memory 21 (902) and reports the completion to the write command from the service server (904).

With reference to the metadata of the folder of File System storing the file, Request Manager sets a TOV indicator to the metadata of the file (906) and saves the metadata to a metadata folder.

Next, with reference to the TOV indicator of the metadata of the file, Request Manager selects an LU# having an indicator matched with the TOV indicator from the second management table (908). Next, with reference to the operation mode of the LU#, whether the operation mode of the LU is the ready mode allowing immediate storage of data or not is determined (910). If it is in the ready mode, Storage Manager determines an HDD included in the LU from the first management table and transmits the data and the identification information of the HDD for storing the data to the storage apparatus. After that, the DKA of the storage apparatus stores the data to the HDD (914).

Figure 10:
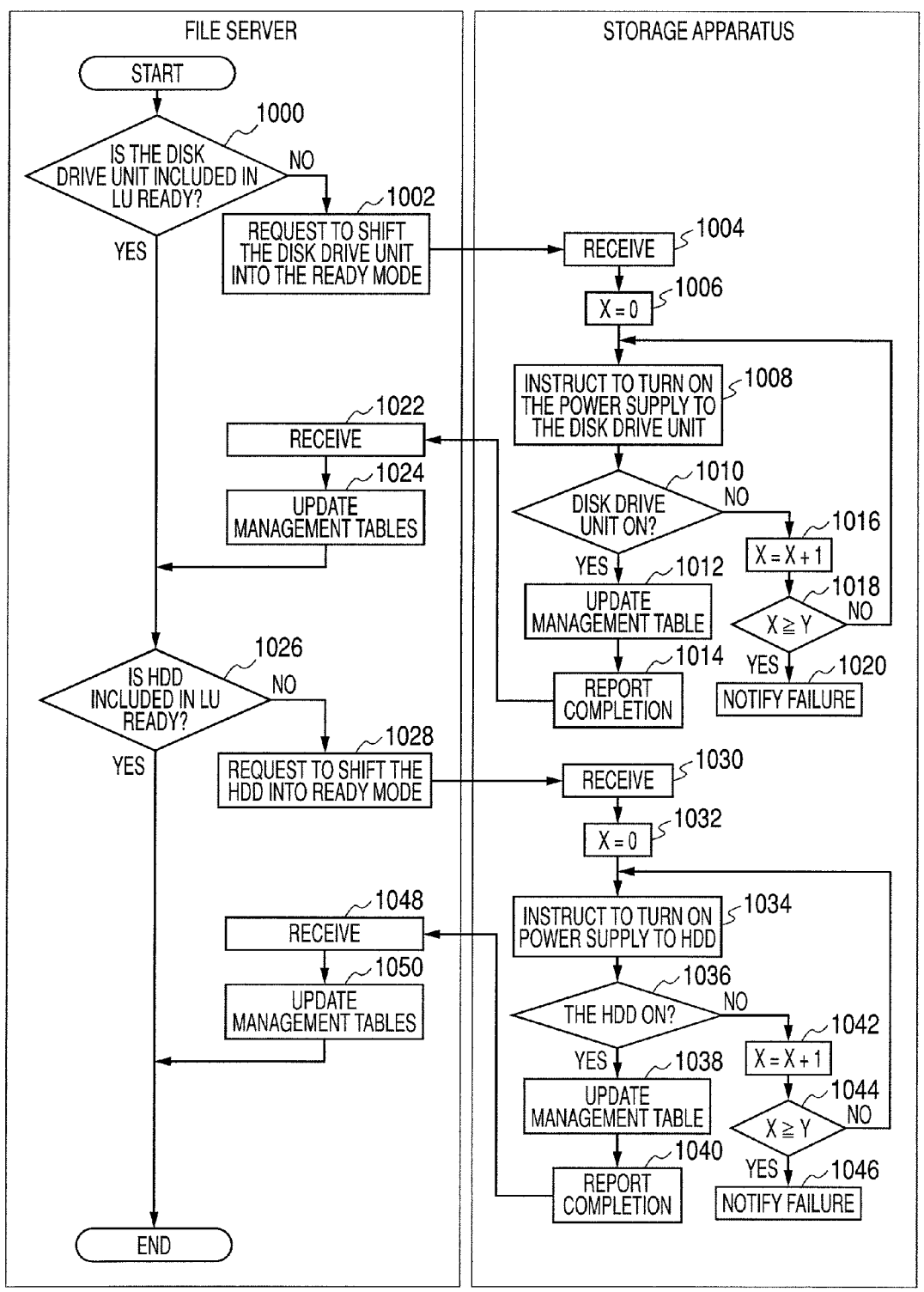
FIG. 10 is a flowchart illustrating a power supply control operation according to one embodiment of the invention.

On the other hand, if the LU is not in the ready mode, Storage Manager shifts to a power supply control operation (912) of the HDD for shifting it to the ready mode. FIG. 10 is a flowchart of the power supply control operation. Request Manager identifies an HDD included in the LU and a disk drive unit including the HDD based on the first management table.

With reference to the operation mode of the disk drive unit on the first management table, Request Manager determines that the disk drive unit is ready if the operation mode is ON and determines that it is not ready if the operation mode is OFF (1000). If it is determined as not ready, Request Manager requests the power supply control program in the storage apparatus a command to shift the disk drive unit into the ready mode (1002). The storage apparatus having received the request sets 0 to a control symbol (X) for determining whether it is beyond an upper limit value of the number of times of implementation of the processing for shifting the disk drive unit to the ready mode or not (1004 and 1006) and outputs an instruction to turn on the switch connecting to the disk drive unit to the power supply control circuit 52 (1008).

The power supply control program determines whether the power supply to the disk drive unit has been turned on or not (1000). If not, the control symbol (X) is incremented (1006), and whether the control symbol after the increment is equal to or higher than a maximum value Y or not is determined (1008). If not, the power supply to the disk drive unit is turned on again. If so, a failure notification is performed to the file server since it is beyond the upper limit value of the processing for shifting the disk drive unit to the ready mode (1020).

If the LU has multiple applicable disk drive units (such as the LU 1 on the first management table), Request Manager and the power supply management program determine whether the power supplies of all of the disk drive units are ON or not. If not, an operation is performed for turning on the power supplies to the disk drive units.

If the power supply control program of the storage apparatus determines that the processing of turning on the disk drive units has succeeded, the power supply control program updates the operation mode of the disk drive units on the first management table from OFF to ON (1012) and transmits a completion report (1014) to Request Manager. After receiving the completion report, Request Manager updates the first management table and second management table stored in the local memory in the same manner (1022 and 1024).

If Request Manager determines that the disk drive unit is in the ready mode (1000) or if the processing of turning on the power supply to the disk drive unit completes, whether all of the HDDs included in the LU are in the ready mode allowing response to an access request or not is determined (1026). If not, the request to shift at least the HDD not in the ready mode to the ready mode (1028) is transmitted to the power supply control program of the storage apparatus. The power supply program of the storage apparatus having received the request (1030) shifts all of the multiple HDDs into the ready mode, then updates the management tables and transmit them to Request Manager (1030 to 1046), in the same manner as that of the operation for turning on the power supply of the disk drive unit. After updating the first management table (1048 and 1050), Request Manager moves to the data storage processing (914) in FIG. 9.

The operations on the flowcharts in FIGS. 9 and 10 allow the file server to store the data in an LU in a sufficient power saving mode according to the TOV indicator of the data received from the service server, also satisfying the access performance of response of the indicator. In other words, online data is stored in an LU set in the ready mode at all times. Near line data is stored in an LU set in the spin down mode, and offline data is stored in an LU set in the HDD off mode.

Therefore, in the file server, even a read request for online data that requires a high access performance of response (with a lower TOV indicator) from the service server can be responded by an HDD included in an LU storing online data within several seconds, and the online data can be transmitted to the service server quickly. On the other hand, even in response to a read request for near line data or offline data from the service server, the file server can transmit the data to the service server securely within a longer TOV range. Thus, data can be stored in an LU having an appropriate power saving function according to the access performance of response of the data, such as the TOV indicator. Therefore, the power saving mode that can provide a sufficient power saving effect can be used to reduce the power consumption, satisfying the accessibility required by the service server.

Figure 11:
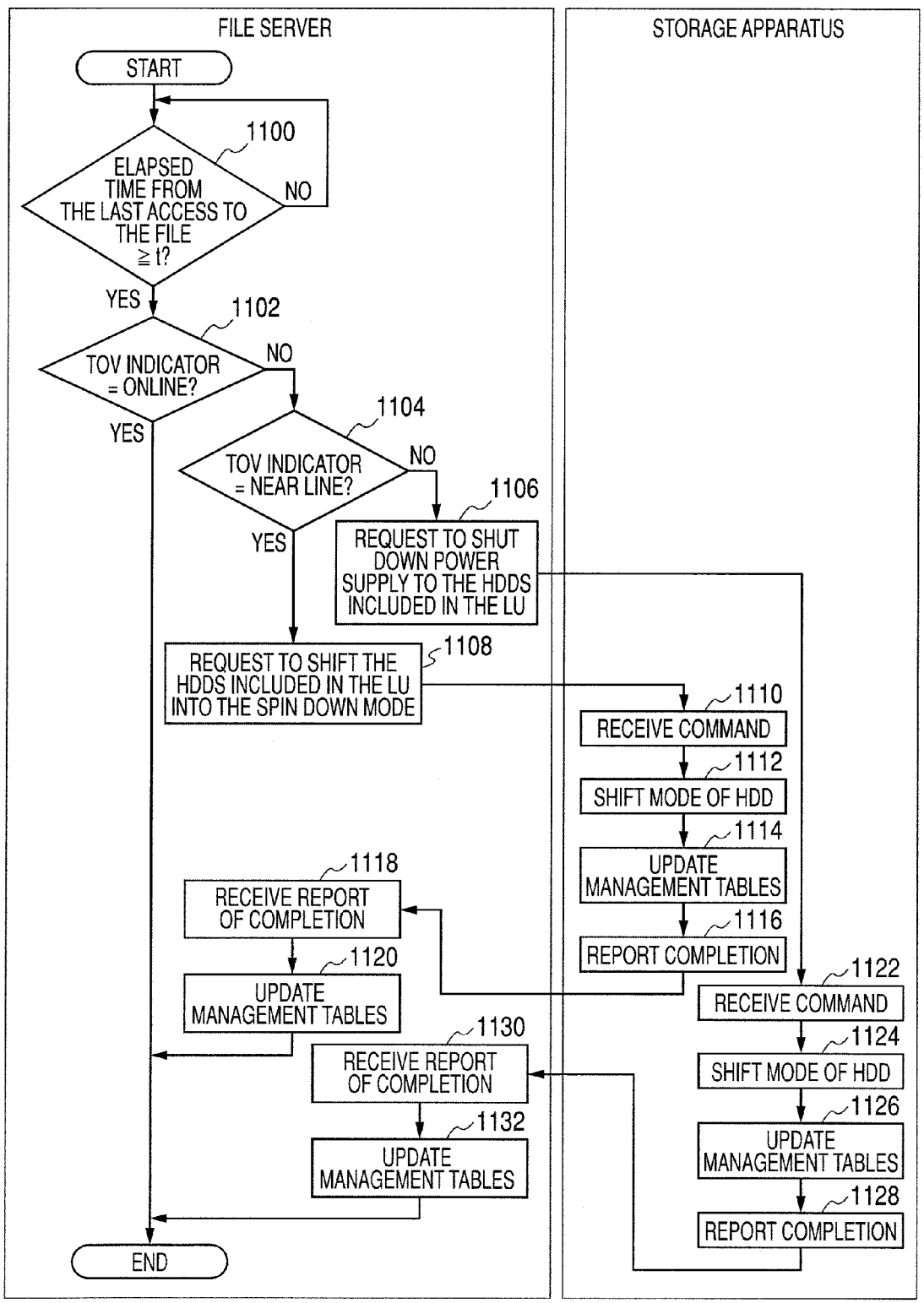
FIG. 11 is a flowchart for shifting storage devices in the storage apparatus into a power saving mode according to one embodiment of the invention.

FIG. 11 is a flowchart illustrating an operation for shifting the ready mode of the HDD in the storage apparatus to the power saving mode. Request Manager of the file server repetitively performs the operation on the flowchart at predetermined time intervals. Request Manager scans metadata folders and checks whether any metadata has the last access time to the file beyond a predetermined time or not (1100).

If it is determined so, whether the TOV indicator of the metadata is Online or not is determined (1102). If so, the processing ends since the power supply to disk drive units, the power supply to HDDs and the rotational speed are not required to control.

If the TOV indicator is not Online, whether the TOV indicator is Near Line or not is determined. If not, Request Manager identifies an LU corresponding to the folder storing the file in order to shut down the power supply to the HDDs, refers to the first management table and transmits a request to shut down the power supply to the multiple HDDs corresponding to the LU (1106) to the power supply control program of the storage apparatus.

After receiving the request for shutting down the power supply to the HDDs (1110), the power supply control program of the storage apparatus shifts the modes of the HDDs so that the DKA can turn off the power supply to the HDDs (1114), updates the operation modes on the first management table and the second management table (1114), and reports the completion to Request Manager (1116). Request Manager having received the report of the completion updates the operation modes on the first management table and the second management table and exits the processing (1118 and 1120).

On the other hand, if the TOV indicator of the metadata is Near Line, Storage Manager transmits a request to shift the multiple HDDs into the spin down mode (1108) to the power supply management program. The power supply management program receives the request (1110) and then issues a command to change the power saving modes of the HDDs through the DKA in order to reduce the rotational speed of the HDDs. In response to the reception of the command, the HDDs not in the spin down mode are shifted into the spin down mode (1112), and the power supply control program updates the operation modes on the first management table and the second management table to the spin down mode (1114). The file server also updates the operation modes on the first management table and second management table (1116 to 1120).

In this way, the file server and the storage apparatus can shift the operation mode of the HDDs from the ready mode to a power saving mode that has been set if the HDDs are not accessed for a predetermined period of time.

Figure 12:
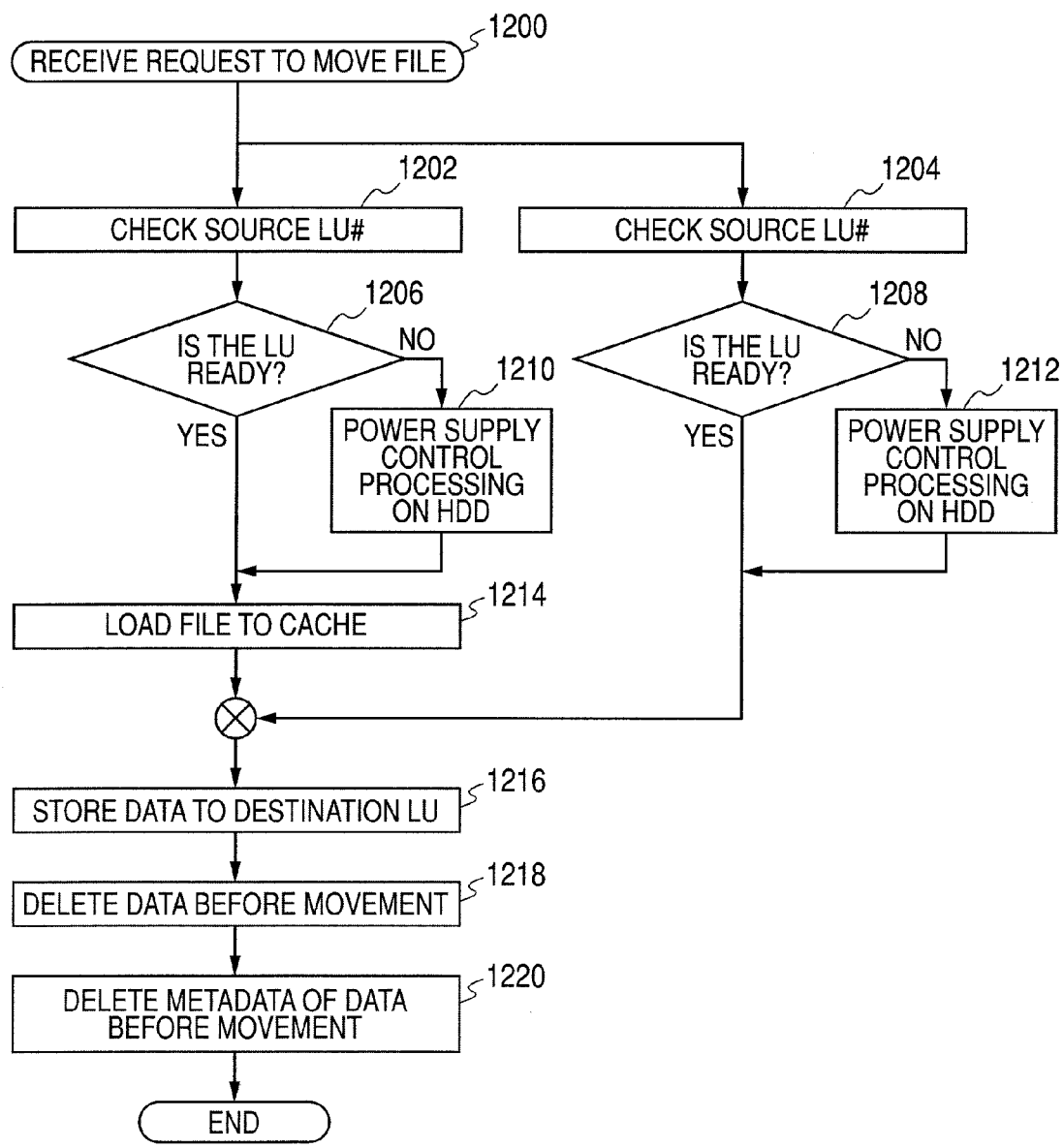
FIG. 12 is a flowchart illustrating a processing operation by the file server in a case where the TOV indicator of metadata is changed according to one embodiment of the invention.

Next, with reference to FIG. 12, a processing operation by the file server will be described in a case where the TOV indicator of metadata is changed. In a case where the TOV indicator of metadata corresponding to data stored in an LU is changed, the service server issues a request for moving the file to the file server. The file server may be configured to automatically perform the processing at and subsequent to 1200 if the TOV indicator of metadata is changed.

After receiving the request for moving the file from a folder storing it to another folder (1200), the file server recognizes the identification information of a source LU (1202) and the identification information of a destination LU (1204) from the information on the source folder and the destination folder. In this case, the file may be moved from a folder for Near Line or Offline to a folder for Online or the reverse, and, with that, this processing changes the destination LU.

Next, Request Manager uses the second management table to determine whether the source LU and destination LU are in the ready mode or not (1206 and 1208). If not, Request Manager performs the power supply control flow (FIG. 10) such that all of the HDDs included on the LUs can be in the ready mode (1210 and 1212).

Next, based on the request form Request Manager, the DKA of the storage apparatus loads the data in the source LU from the HDD and temporarily stores it to the cache memory 34 (1214), stores the temporarily stored data to a storage area of the destination LU (1216) and deletes the data stored in the storage area of the source LU (1218). Then, Request Manager deletes the metadata of the source data from the folder (1220).

According to this embodiment, the file server can recognize an LU in the storage apparatus and the HDDs corresponding to the LU since it holds the first management table and second management table. Then, the service server sets to the data the tendency of access to the data and stores the data in the HDD having an optimum power saving characteristic to the tendency.

In a variation example, which will be described later, of this embodiment, the file server does not hold the first management table but holds the second management table. Therefore, the LU for the storage area can be identified, but the HDDs included in the LU cannot be identified. If the file server requests to shift an LU into the ready mode or into a power saving mode, the storage apparatus identifies and controls the HDDs included in the LU. The configuration can reduce the load on the file server. If multiple storage apparatus connect to the file server, the processing can be distributed. Therefore, the performance of the entire storage system can be improved. The processing will be described more specifically below.

First of all, the operation for defining the second management table by the file server will be described. It is different from the flow in FIG. 7 that data to be exchanged between the file server and storage apparatus does not contain the first management table but is the second management table.

More specifically, if Request Manager of the file server 16 receives an LU discovery request in the storage apparatus from the management device of the file server, Request manager requests the storage apparatus 30 the second management table (700). If the request is received (702), the CHA 32 of the storage apparatus loads the second management table from the shared memory 38 and transmits the second management table to Request Manager of the file server (704). Request Manager receives the second management table (706) and then stores it in the local memory 22 (708).

The file server may receive information corresponding to the items of the second management table from the storage apparatus and may create and store the second management table in the file server.

The processing of creating a folder is the same as the flow in FIG. 8. The flowchart for creating the folder in File System by the file server is the same as that in FIG. 9. However, the power supply control processing (912) applies the power supply control processing in FIG. 13, which will be described below. In storing data (914), Request Manager of the file server designates a destination LU and identifies the HDDs included in the LU in the storage apparatus.

Figure 13:
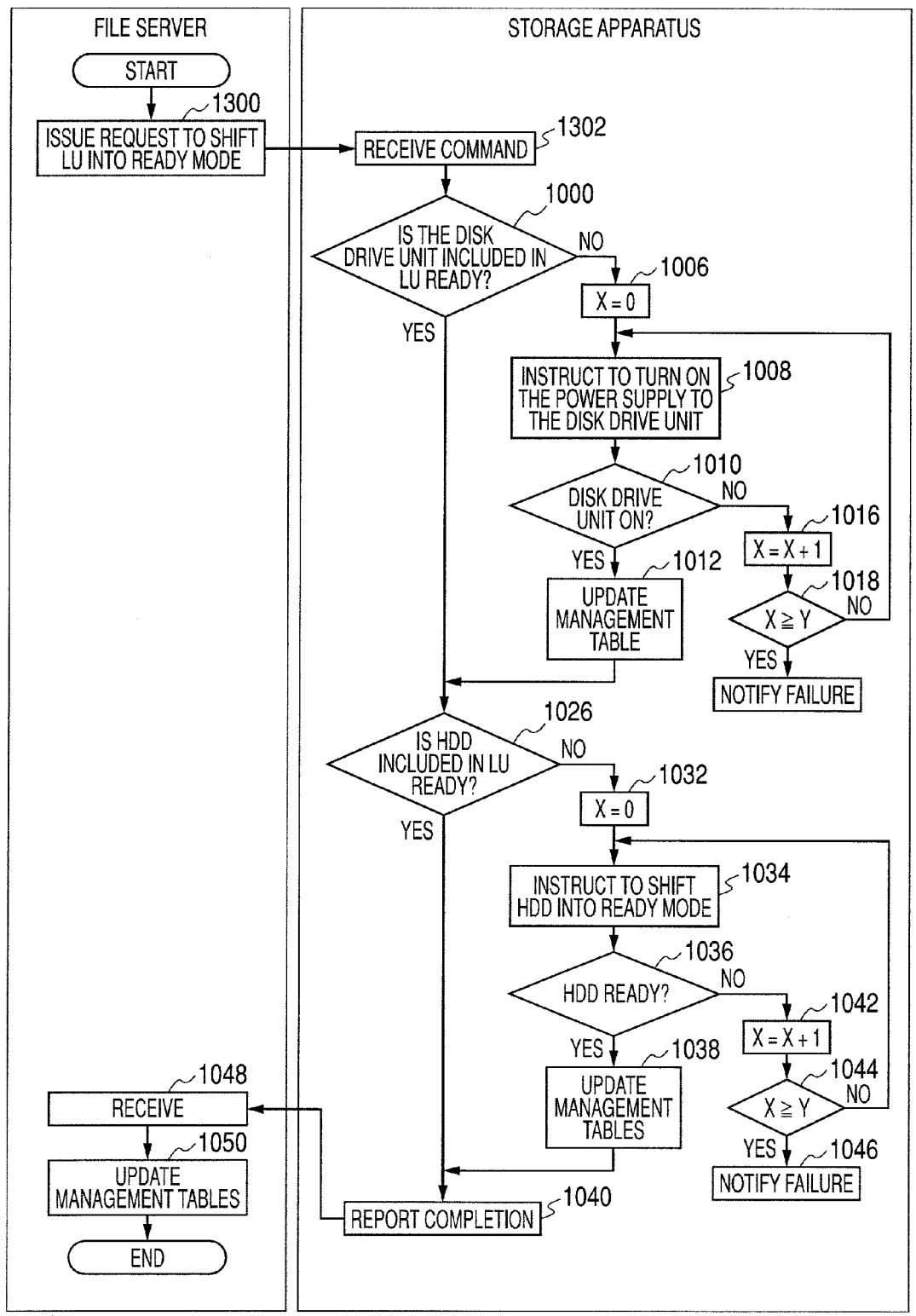
FIG. 13 shows a variation example of that in FIG. 10 and is a flowchart illustrating a power supply control operation according to one embodiment of the invention.

FIG. 13 is a flowchart of the power supply control processing and shows a variation example in FIG. 10, which has been described above. According to the above-described embodiment, the file server side recognizes the disk drive units including an LU and the HDDs included in the LU and the storage apparatus controls the operation modes of the disk drive units and HDDs based on an instruction from the file server. On the other hand, referring to FIG. 13, the file server designates an LU on which the power supply control is performed and issues a command to the storage apparatus (1300). Then, the storage apparatus having received the command identifies the disk drive unit to which the LU belongs based on the first management table held by the storage apparatus. Then, the DKA of the storage apparatus determines whether the disk drive unit is in the ready mode or not (1000). The processing after the determination is the same as that (1006 to 1018) in FIG. 10. Next, the storage apparatus identifies the HDDs included in the LU based on the first management table held by the storage apparatus. Then, the storage apparatus determines whether the HDDs included in the LU are in the ready mode or not (1026). The processing after the determination is the same as that (1032 to 1046) in FIG. 10. When the file server receives the report of the completion from the storage apparatus, the file server updates the operation modes on the second management table (1050).

Figure 14:
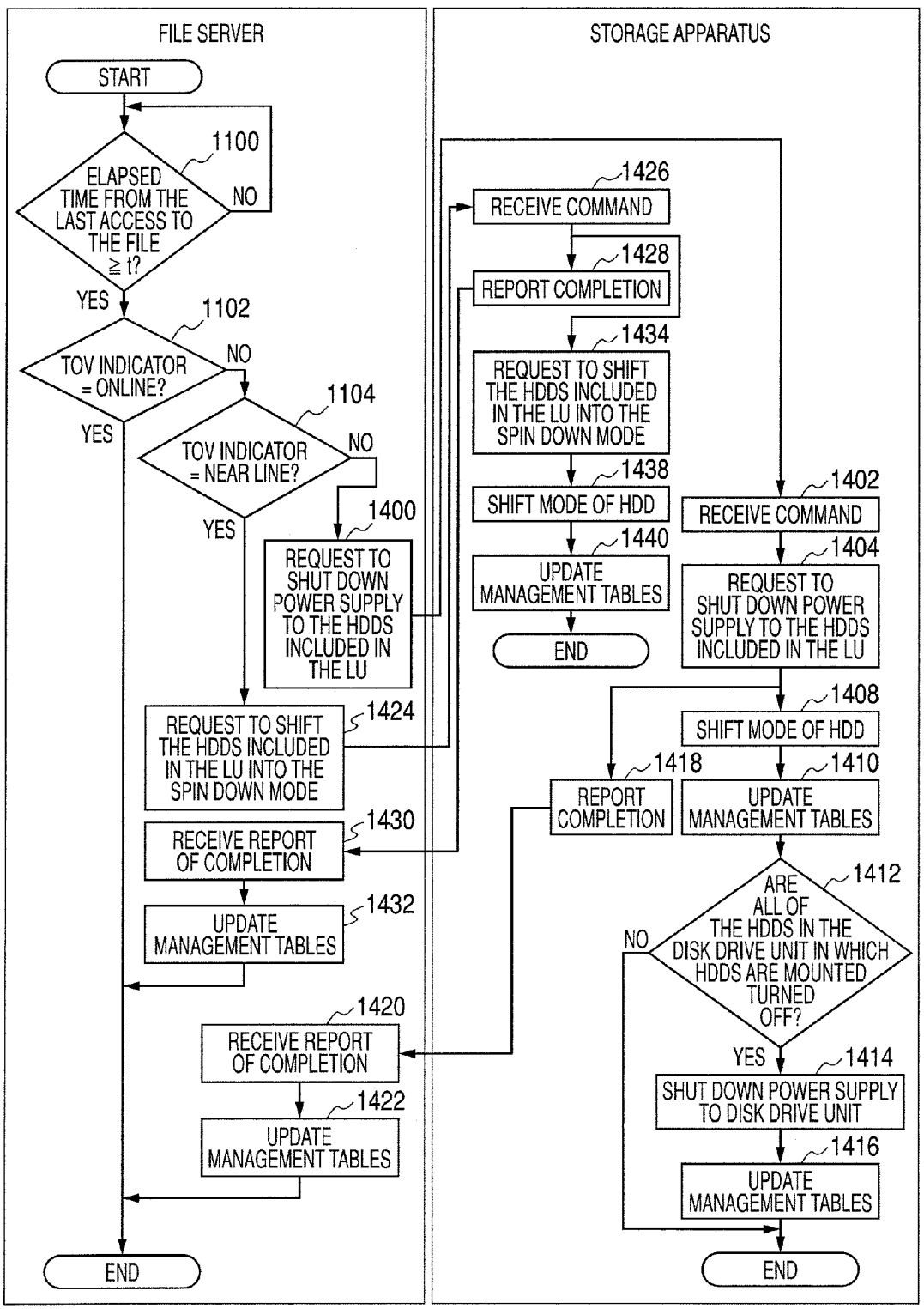
FIG. 14 shows a variation example of that in FIG. 11 and is flowchart for shifting the storage devices in the storage apparatus into a power saving mode according to one embodiment of the invention.
Figure 15:
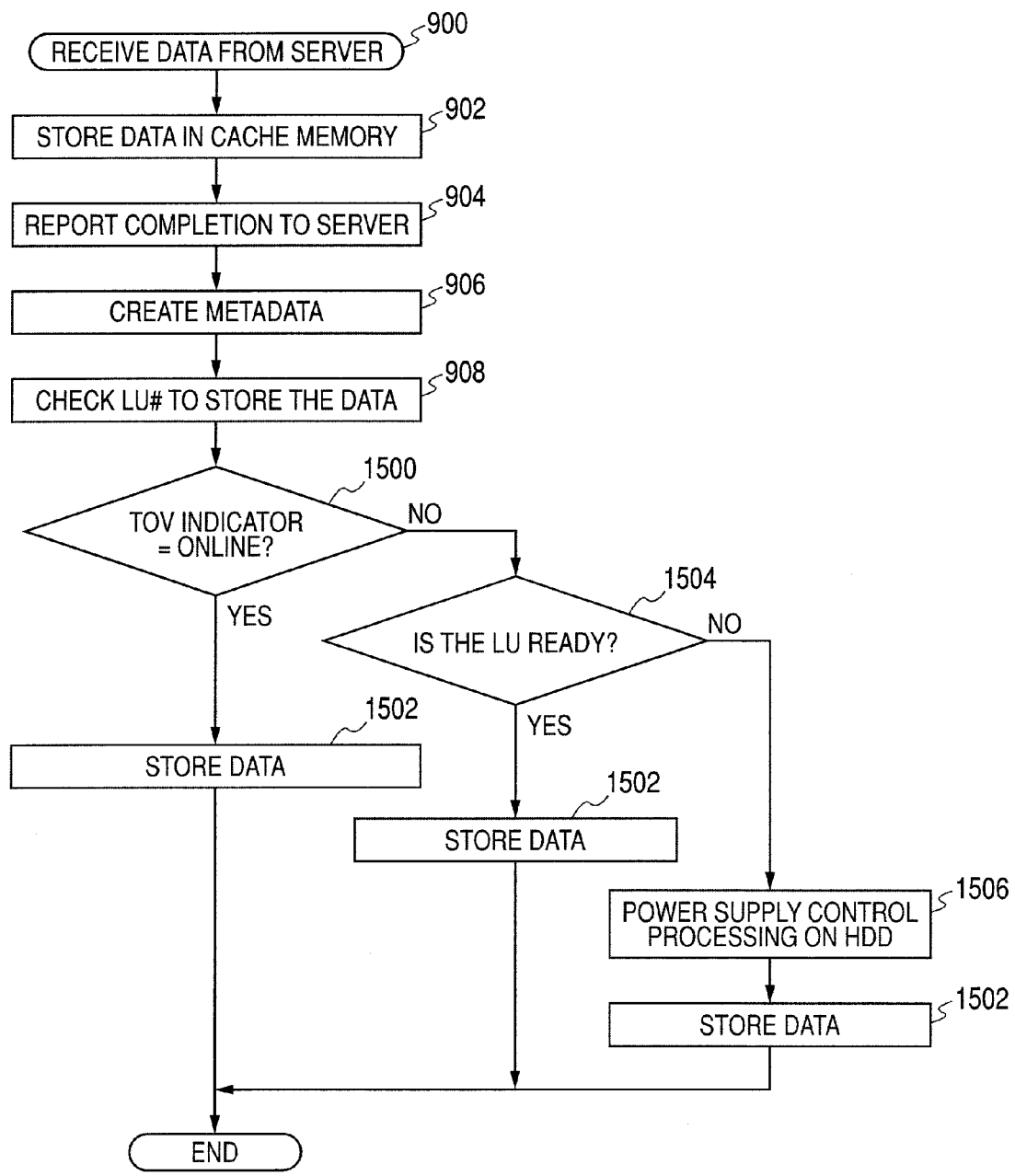
FIG. 15 is a variation example of that in FIG. 9 and is flowchart illustrating an operation for storing data received from the service server to the storage apparatus by the file server according to one embodiment of the invention.

FIG. 14 is a variation example of the flowchart for shifting the HDDs in the storage apparatus shown in FIG. 11 into a power saving mode. Referring to FIG. 11, Request Manager of the file server identifies an LU to store data and the HDDs included in the LU and requests the storage apparatus to shift to a power saving mode. Referring to FIG. 15 on the other hand, Request Manager of the file server identifies an LU to store data and requests the storage apparatus to shift to a power saving mode.

The processing in 1100, 1102 and 1104 is the same as that in FIG. 11.

Next, Request Manager of the file server transmits a request for turning off the operation mode of the LU to the DKA of the storage apparatus (1400). The DKA receives the request for turning off the operation mode of the LU (1402), then identifies the HDDs included in the LU based on the first management table and requests to turn off the power supply to the HDDs (1404). Then, the DKA reports the completion to the file server (1418). In response to the completion, Request Manger of the file server updates the operation modes on the second management table (1420 and 1422). On the other hand, the storage apparatus changes the modes of the HDDs into the HDD off mode (1408) and updates the first management table and second management table (1410). Then, the storage apparatus determines whether all of the HDDs in the disk drive unit in which HDDs are mounted are turned off or not (1412). If so, the power supply of the disk drive unit having the HDDs is turned off, and it is reflected to the update and registration on the first management table (1414 and 1416).

Request Manager of the file server transmits to the storage apparatus a request for shifting the HDDs in an LU to store data into the spin down mode (1424), and the DKA of the storage apparatus receives the request (1426). After receiving it, the DKA transmits the report of the completion to the file server, and the file server updates and registers the second management table (1430). If receiving the request for shifting the LU to into the spin down mode, the DKA of the storage apparatus identifies the HDDs included in the LU based on the first management table and requests for shifting the HDDs included in the LU into the spin down mode (1434). After shifting the HDDs into the spin down mode (1438), the first management table and the second management table in the shared memory are updated and registered (1440).

Next, variation examples of the method for data storage will be described below. The variation examples are all applicable to the two embodiments above.

FIG. 15 shows a variation example in FIG. 9 and is a flowchart for an operation for storing a file data transmitted from the service server to the file server into a target HDD.

Since the steps 900 to 906 are the same as those in FIG. 9, the same reference numerals are given thereto. In step 908, Request Manager of the file server checks whether the TOV indicator for the LU is Online or not with reference to the second management table (1500).

If Request Manager determines so, the processing moves to data storage processing (1502). In the data storage processing, if the local memory of the file server stores the first management table and the second management table, the file server identifies a destination HDD and instructs the storage to the storage apparatus. If the second management table is stored in the local memory of the file server, the file server identifies a destination LU and instructs the storage to the storage apparatus. Then, the DKA of the storage apparatus identifies an HDD of the LU and stores the data.

In step 1500, the manager program determines whether the LU is in the ready mode or not if the TOV indicator is not Online (1504). If so, the processing moves to the data storage processing (1502). If not on the other hand, the processing moves to HDD power supply control processing (1506). In the HDD power supply control processing, if the local memory of the file server stores the first management table and the second management table, the power supply control processing in FIG. 10 is performed. If the local memory of the file server stores the second management table, the power supply control processing in FIG. 13 is performed. After that, the processing moves to the data storage processing (1502). In this way, by determining whether the TOV indicator of the LU is online data or not, whether the LU is already in the ready mode or not can be checked, and efficient data storage can be performed.

Figure 16:
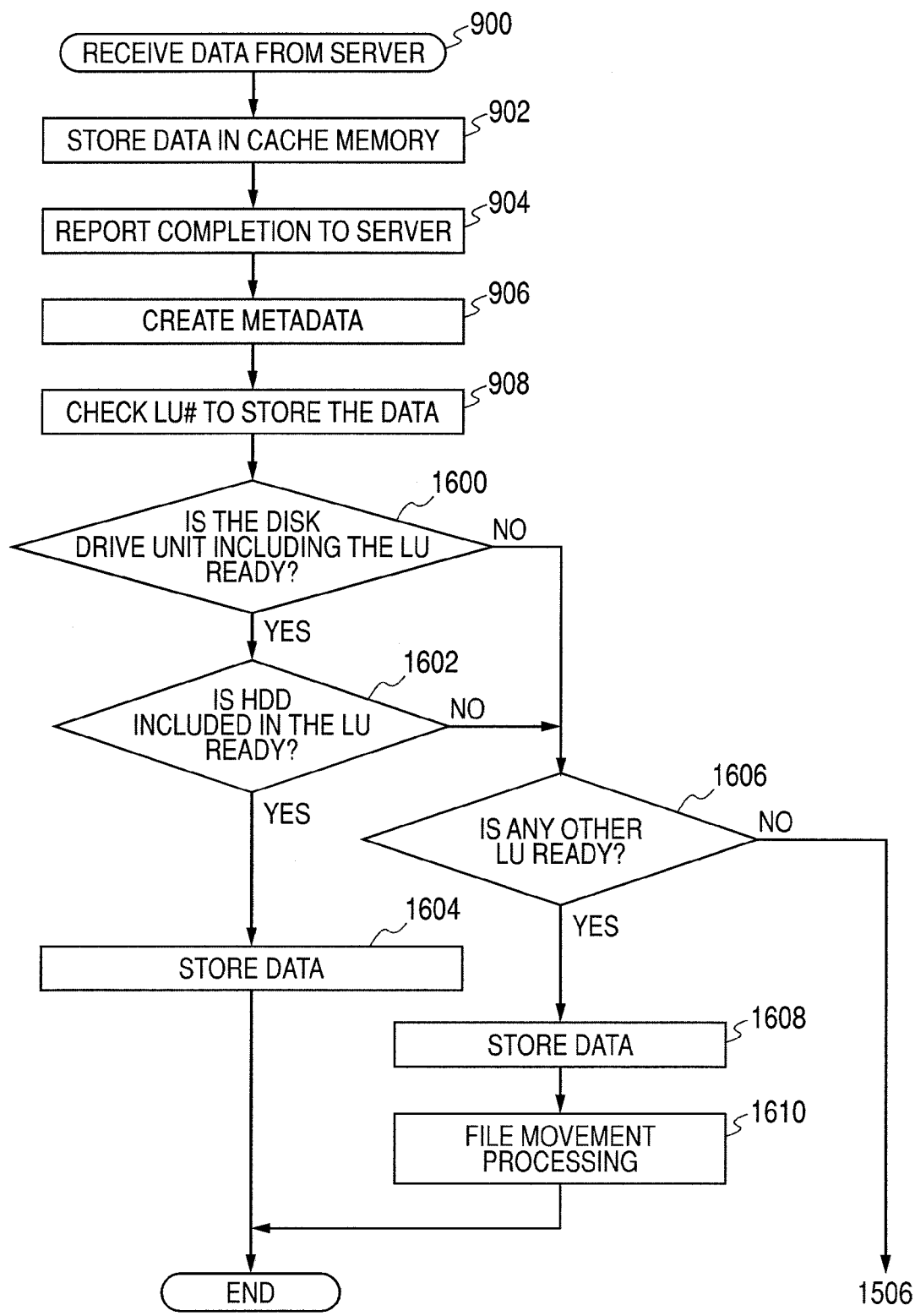
FIG. 16 is a variation example of that in FIG. 9 and is a flowchart illustrating the operation for storing data received from the service server to the storage apparatus by the file serve according to one embodiment of the invention r.

FIG. 16 shows another embodiment as a variation example in FIG. 9. Since the processing in the steps 900 to 908 is the same as that in FIG. 9, the same reference numerals are given. The subsequent processing will be described in a case where the local memory of the file server stores the first management table and the second management table and in a case where the local memory of the file server stores the second management table below.

If the local memory of the file server stores the first management table and the second management table, Request Manager in the file server determines whether the disk drive unit to which the LU to store data belongs is in the ready mode or not (1600). If not, whether other disk drive units have other LUs in the ready mode or not is determined (1606). If no LUs in the ready mode are available, the processing in and after 1506 in FIG. 15 is performed, whereby the HDDs included in the destination LU are shifted into the ready mode. If any other LU in the ready mode is available, in order to store data to the other LU, the file server identifies the destination HDD with reference to the first management table and instructs the data storage to the storage apparatus (1608). After that, in asynchronization with the data storage, the LU being the destination of the file is shifted into the ready mode, and the file is moved from the other LU to the destination LU (1610).

If the disk drive unit to which the LU to store the data belongs is in the ready mode (1600), Request Manger of the file server checks whether the HDDs included in the destination LU are in the ready mode or not based on the first management table. If not, the processing moves to 1606. If so, in order to store the data to the destination LU, the file server identifies the destination HDD based on the first management table and instructs the storage apparatus to store the data.

Next, the case will be described in which the local memory of the file server stores the second management table. The DKA of the storage apparatus determines whether the disk drive unit to which the LU to store data belongs is in the ready mode or not (1600). If not, whether any other LUs in the ready mode are available in other disk drive apparatus or not is determined (1606). If not LUs in the ready mode are available, the processing in and after 1506 in FIG. 15 is performed, and the HDDs included in the destination LU are shifted to the ready mode. If any other LUs in the ready mode are available, in order to store data to the other LU, the storage apparatus identifies the destination HDD based on the first management table and stores the data (1608). After that, in asynchronization with the data storage, the LU being the destination of the file is shifted into the ready mode, and the file is moved from the other LU to the destination LU (1610).

If the disk drive unit to which the LU to store the data belongs is in the ready mode (1600), the DKA of the storage apparatus checks whether the HDDs included in the destination LU are in the ready mode or not based on the first management table. If not, the processing moves to 1606. If so, in order to store the data to the destination LU, the DKA of the storage apparatus identifies the destination HDD based on the first management table and instructs the storage apparatus to store the data.

The file movement processing in the 1610 applies a file management table in FIG. 17. The file management table includes the name of a file, information on a near line or offline folder 1 to originally store near line data or offline data (or the LU# corresponding to the folder and the logical address) and information on a online folder 2 provisionally storing the data (or the LU# corresponding to the folder and the logical address).

The file management table is stored in the LM (22) of the file server. Storage Manager of the file server reviews the file management table periodically. If the number of file names is equal to or higher than a predetermined value, the data is moved from the online LU to the near line or offline LU. Alternatively, the processing may be performed after a lapse of a predetermined period of time.

What is claimed is:

1. A storage system comprising:
a storage apparatus including a plurality of storage devices on which a plurality of logical units is configured and a first controller that controls accesses to the plurality of logical units; and
a file server coupled to said storage apparatus and including a second controller and a memory storing management information which indicates relationships between each of the plurality of logical units and each of a plurality of indicators;
wherein the first controller,
in response to a request to create a first folder with a first indicator, creates the folder on one or more first logical units included in the plurality of logical units, the one or more first logical units related to the first indicator.

2. The storage system according to claim 1, wherein;
if the first controller receives an access request to the first logical unit which is in the power saving mode, the first controller stores the data in the second logical unit which is different from the first logical unit, shifts the power saving mode of the first logical unit to the ready mode; and migrates the data from the second logical unit to the first logical unit.

3. A storage method implemented by a storage system which includes:
a storage apparatus including a plurality of storage devices on which a plurality of logical units is configured and a first controller that controls accesses to the plurality of logical units; and
a file server coupled to said storage apparatus and including a second controller and a memory storing management information which indicates relationships between each of the plurality of logical units and each of a plurality of indicators;
the storage method comprising operations of:
in response to a request to create a first folder with a first indicator, creating the folder on one or more first logical units included in the plurality of logical units, the one or more first logical units related to the first indicator.

4. The storage method according to claim 3, wherein each of the indicators relate to power saving modes which can be applied to each of the plurality of logical units.

5. The storage method according to claim 3, wherein the power saving modes include a first mode that shuts down power supply to a storage device which configures a logical unit included in the plurality of logical units, a second mode that stops rotation of a disk in a storage device which configures a logical unit, and a third mode that unloads a head in a storage device which configures a logical unit.

6. The storage method according to claim 5, wherein:
the memory in the file server stores metadata relating to data transmitted from the computer; and
the second controller sets an indicator included in the plurality of indicators to the metadata.

7. The storage method according to claim 6, wherein:
the file server further includes a file system that defines the first folder; and
after the data transmitted from the computer is stored in the first folder, the first indicator set to the first folder is set to the metadata of the data.

8. The storage method according to claim 5, wherein the first controller shifts a ready mode of the storage area to the power saving mode, after a predetermined period of time from the last access time is passed.

9. The storage method according to claim 3, wherein;
if the first controller receives an access request to the first logical unit which is in the power saving mode, the first controller stores the data in the second logical unit which is different from the first logical unit, shifts the power saving mode of the first logical unit to the ready mode; and migrates the data from the second logical unit to the first logical unit.

* * * * *